United States Patent [19]

Roger

[11] Patent Number: 4,536,688
[45] Date of Patent: Aug. 20, 1985

[54] ELECTRIC DRILLING MACHINE

[75] Inventor: Jean Roger, Conflans Sainte Honorine, France

[73] Assignee: Peugeot Outillage Electrique, Nanterre, France

[21] Appl. No.: 694,918

[22] Filed: Jan. 28, 1985

Related U.S. Application Data

[63] Continuation of Ser. No. 426,444, Sep. 29, 1982, abandoned.

[30] Foreign Application Priority Data

Dec. 15, 1981 [FR] France .................................. 81 23386

[51] Int. Cl.³ .............................................. G01R 31/02
[52] U.S. Cl. .................................. 318/490; 74/421 R; 318/305; 340/680
[58] Field of Search .................. 340/380, 680; 310/50; 74/421.5; 318/305, 490

[56] References Cited

U.S. PATENT DOCUMENTS

| | | | |
|---|---|---|---|
| 3,029,658 | 4/1962 | Dassance | 74/421.5 |
| 4,027,546 | 6/1977 | Alessio | 74/421.5 X |
| 4,211,967 | 7/1980 | Akiyama et al. | 318/490 |
| 4,317,176 | 2/1982 | Saar et al. | 318/305 X |
| 4,410,846 | 10/1983 | Gerber et al. | 318/305 X |

Primary Examiner—Ulysses Weldon
Attorney, Agent, or Firm—Sughrue, Mion, Zinn, Macpeak and Seas

[57] ABSTRACT

The machine comprises an electric driving motor, a speed reducer having at least two mechanical ratios coupled to the output shaft of the motor, a device for changing the mechanical ratio and a speed variator of the electric motor. The machine further comprises devices (7, 35, 36, 41) for selecting and displaying the speeds of rotation of the electric motor coupled to the device for changing the mechanical ratio.

13 Claims, 8 Drawing Figures

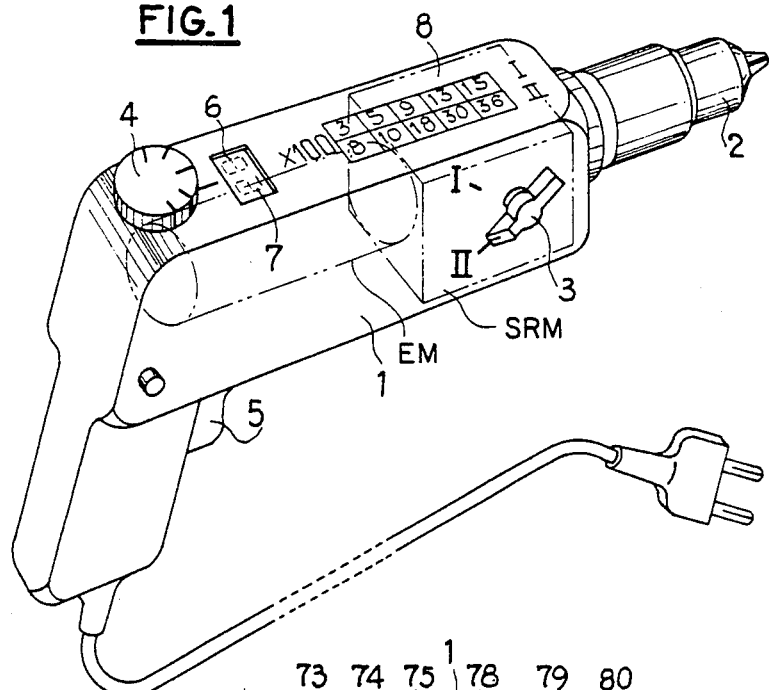
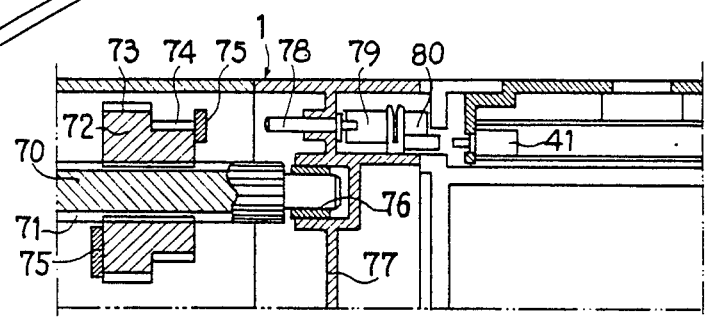
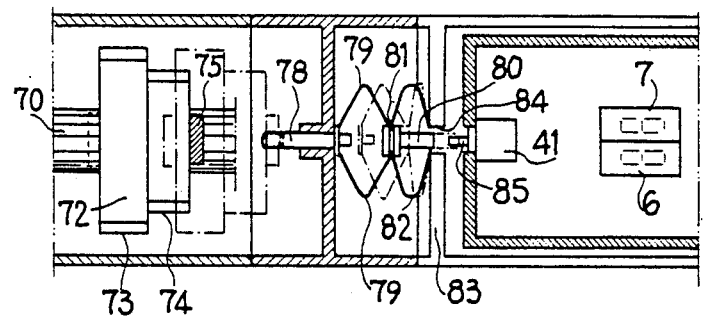
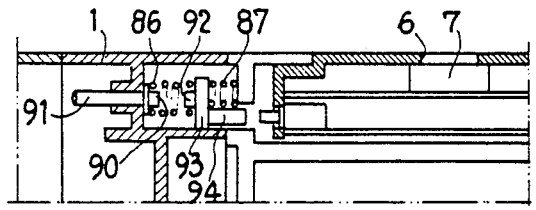

ELECTRIC DRILLING MACHINE

This application is a continuation, of application Ser. No. 426,444, filed Sept. 29, 1982, now abandoned.

BACKGROUND OF THE INVENTION

The present invention relates to portable machines such as drilling machines and relates more particularly to an electric drilling machine having a plurality of speeds of rotation of the spindle.

In order to ensure that a drilling machine is adaptable to various drilling diameters in different materials such as wood, metal, concrete or other materials, it is desirable to provide it with regulating means providing a plurality of speeds of its chuck.

Machines of this type are known which are provided with an electronic speed variator.

These machines, which usually comprise a speed reducer having two ratios associated with the motor driving the spindle and controlled by a manually operated ratio changing means, are liable to operate under adverse conditions of speed and torque in that the electronic variator controls the output speed of the spindle without taking into account the mechanical ratio engaged.

Drilling machines having an electronic speed variator are known which comprise instantaneous display means for the speed of rotation of the machine However, such a display only gives an indication of the conditions under which the machine is employed without suggesting to the user the optimum conditions of use bearing in mind the material worked upon and the section of the holes to be drilled.

Consequently, there is often wear of the drill due to the use of the machine at unsuitable speeds of rotation.

Further, the motor of the machine may be subjected to excessive over-heating which is liable to produce serious breakdowns.

SUMMARY OF THE INVENTION

An object of the invention is to overcome the aforementioned drawbacks and to provide a portable electric machine, such as a drilling machine, which may be used always under optimum conditions of torque and speed of rotation irrespective of the work to be carried out and the nature of the materials to be drilled.

The invention provides a machine, and in particular an electric drilling machine, comprising an electric driving motor, a speed reducer having at least two mechanical ratios coupled to the output shaft of the motor, mechanical ratio changing means and a speed variator of the electric motor, wherein there are also provided means for selecting and displaying speeds of rotation of the electric motor coupled to said mechanical ratio changing means.

With such an arrangement, the user may know, before starting up the machine, its speed of rotation or its operating rate with sufficient precision, which is particularly useful in respect of machines employing various accessories in respect of which the recommended operating speed varies from one tool to the other for reasons of quality of the work, safety or comfort for the user, life of the tool, etc. . .

Further, as the user knows in advance the speed of rotation of the machine, he can terminate the mechanical and electronic adjustments of the machine before starting the work.

BRIEF DESCRIPTION OF THE DRAWINGS

Further features of the invention will be apparent from the ensuing description with reference to the accompanying drawings which are given solely by way of example and in which :

FIG. 1 is a diagrammatic perspective view of an electric drilling machine according to the invention;

FIG. 6 is a partial sectional view of the part of the drilling machine shown in FIG. 1 containing the coupling means between the mechanical ratio changing mechanism and the electronic variator ;

FIG. 7 is a partial sectional view from above of the coupling means shown in FIG. 6, and FIG. 8 a partial sectional view of a modification of the coupling means shown in FIG. 6.

DETAILED DESCRIPTION OF THE PREFERRED EMBODIMENTS

Figure 2:
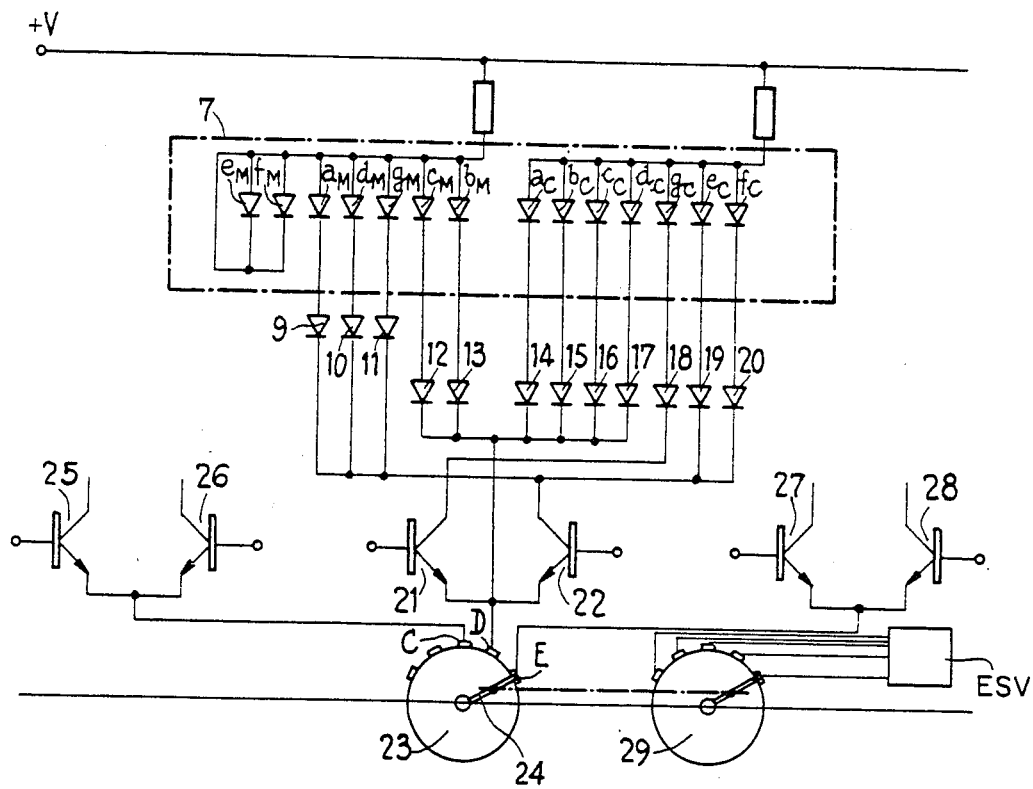
FIG. 2 is an electric diagram of a stage of the display circuit of the drilling machine according to the invention shown in FIG. 1.

In FIG. 1, the invention is assumed to be applied to an electric drilling machine which comprises a body 1 containing an electric motor EM for driving in rotation a chuck 2, a speed reducing mechanism SRM havihg two mechanical ratios the changing of which is controlled by a knob 3 having two positions, an electronic speed variator ESVC (FIGS 2 and 5) controlled by a setting knob 4, and a switch 5 for starting up and stopping the electric motor.

In the upper part of the body 1, a window 6 is provided for a device 7 displaying the speed determined by the electronic variator.

This display device comprises in a conventional manner two series of electroluminescent diodes each of which constitutes the seven segments defining the FIGS. 0 to 9 the selective illumination of which permits the chosen figures to be displayed.

Also provided on the upper part of the drilling machine is a table 8 of the speeds formed by two lines I and II respectively corresponding to the mechanical ratios I and II determined by the position of the actuating knob 3.

In the present embodiment, the table 8 comprises five columns respectively corresponding to the five positions A, B, C, D, E of the switch actuated by the knob 4 setting the electronic variator.

As can be seen in table 8, each of the displayed numbers is represented by its part signifying the hundreds and the thousands, the units and the tens being obtained by multiplying by 100 as indicated on one side of the table 8.

This table, shown hereinafter, therefore comprises ten recommended speeds, namely five speeds corresponding to the mechanical ratio I and five speeds corresponding to the mechanical ratio II.

| A | B | C | D | E | |
|---|---|---|---|---|---|
| 3 | 5 | 9 | 13 | 15 | } × 100 revolutions. |
| 8 | 10 | 18 | 30 | 36 | |

It can be seen that the first column of this table corresponds to the lowest operating speed of the motor and that the speed increases in moving toward the columns on the right.

The diagram shown in FIG. 2 is a general diagram showing the manner in which the circuit controlling the display of column D of the table 8 is arranged, it being understood that the control circuits of the other columns are arranged in a similar manner.

Figure 4:
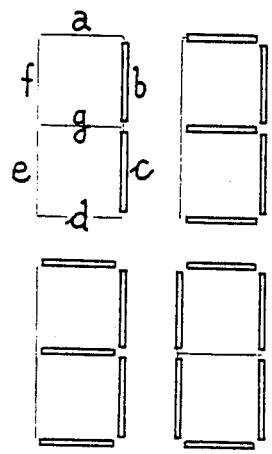
FIG. 4 shows the figures which may be displayed by means of the stage shown in FIG. 2.

The display of column D is shown in FIG. 4 in which it can be seen that each segment adapted to form a portion of the figure upon its illumination is designated by a letter a to g. It can be seen in FIG. 4 that, in order to display the FIG. 13 corresponding to a speed of rotation of 1300 rpm of the spindle, the segments a, b, c, d, g of the hundreds and the segments b, c of the thousands must be illuminated. In order to display the FIG. 30 corresponding to 3 000 rpm, the segments a, b, c, d, e, f, of the hundreds and a, b, c, d, g of the thousands must be illuminated.

It might be mentioned that, in this column, some of the segments are permanently illuminated.

It concerns the segments a, b, c, d, of the hundreds and b, c of the thousands.

Account will be taken of this feature when constituting the stage shown in FIG. 2.

This stage comprises the display device 7 which appears in the window 6 of the housing of the drilling machine shown in FIG. 1. In FIG. 2, the display device 7 proper is surrounded by a rectangle in dot-dash lines.

It comprises two series of electroluminescent diodes $a_C$ to $g_C$ and $a_M$ to $g_M$ each of which represents on the segments figures of the display device, the diodes $a_C$ to $g_C$ corresponding to hundreds and the diodes $a_M$ to $g_M$ corresponding to thousands.

Figure 3:
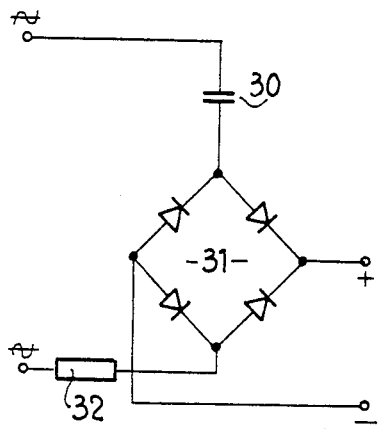
FIG. 3 is an electric diagram of the supply circuit of the display means.

These electroluminescent diodes are fed by a source of rectified voltage, such as the source shown in FIG. 3. In the presently.described embodiment, their anodes are connected to the positive pole of said source and their cathodes are respectively connected through diodes 9 to 20, either in series with the collector-emitter path of a transistor 21 whose base is so connected as to be excited when the knob 3 of the drilling machine is in the low speed position I, or in series with the collector-emitter path of a transistor 22 whose base is so connected as to be excited when the knob 3 of the drilling machine is in the high speed position II, or directly to the negative pole of the source when the corresponding electroluminescent diodes must be permanently illuminated.

The emitters of the transistors 21 and 22 are both connected to a fixed stud D of a switch 23 having five positions, the movable contact 24 of which is driven by the control knob 4 of the drilling machine shown in FIG. 1.

Thus, bearing in mind that in order to display the numbers 13 or 30, the segment a, b, c, d of the hundreds and the segments b, c of the thousands must be illuminated permanently, the corresponding electroluminescent diodes $a_C$, $b_C$, $c_C$, $d_C$, $b_M$ and $c_M$ are directly connected in series with their respective diodes 14, 15, 16, 17, 12, 13 to the stud D of the switch 23.

The segment $g_C$ must also be illuminated in order to display the number 13 so that the electroluminescent diode $g_C$ is connected in series with its diode 18 to the collector of the transistor 21 rendered conductive when the mechanical ratio changing knob 3 is placed in a position corresponding to the ratio I.

In order to display the number 30, the segments e, f, of the hundreds and a, d, g of the thousands must also be illuminated.

The electroluminescent diodes $e_C$, $f_C$, $a_M$, $d_M$ and $g_M$ are therefore connected in series with their associated diodes 19, 20, 9, 10, 11, to the collector of the transistor 22 rendered conductive when the mechanical ratio changing knob 3 is placed in the position corresponding to the ratio II of the high speeds.

The diodes $e_M$ and $f_M$ which are not illuminated for any of the figures of the table, are shorted-out.

The other stages of the display control circuit which respectively correspond to the positions A, B, C, and E, of the knob 4, are similar to the circuit shown in FIG. 2 in which are shown the transistors 25, 26 connected to the fixed stud C and the transistors 27, 28 connected to the fixed stud E.

The connections these transistors to the electroluminescent diodes $a_C$ to $g_C$ and $a_M$ to $b_M$ depend on the numbers to be displayed by the considered stages, namely 9 and 18 for the column C, and 15 and 36 for the column E.

As can be seen in FIG. 2, mechanically coupled to the switch 23 controlling the display is another switch 29 which has as many positions as the switch 23 and is adapted to be connected to the electronic ESV speed variator through the stop-start switch 5 (FIG. 1).

The electronic speed variator ESV may be advantageously of the type described in U.S. Pat. Nos. 4,107,584 issued on Aug. 15, 1978 and 4,110,671 issued on Aug. 29,1978.

Thus the display of a speed value corresponds to the setting of the speed variator.

The electroluminescent diodes are supplied with current by the circuit shown in FIG. 3.

This circuit comprises a capacitor 30 connected to the terminals of the mains supply in series with a full wave rectifying bridge 31 and a resistor 32. The capacitor 30 regulates the current and avoids the heating of the circuit, which renders its use advantageous relative to that of a power resistor.

The electroluminescent diodes are supplied from terminals on that one of the diagonals of the bridge 31 which is not connected to the capacitor 30 and to the resistor 32.

Figure 5:
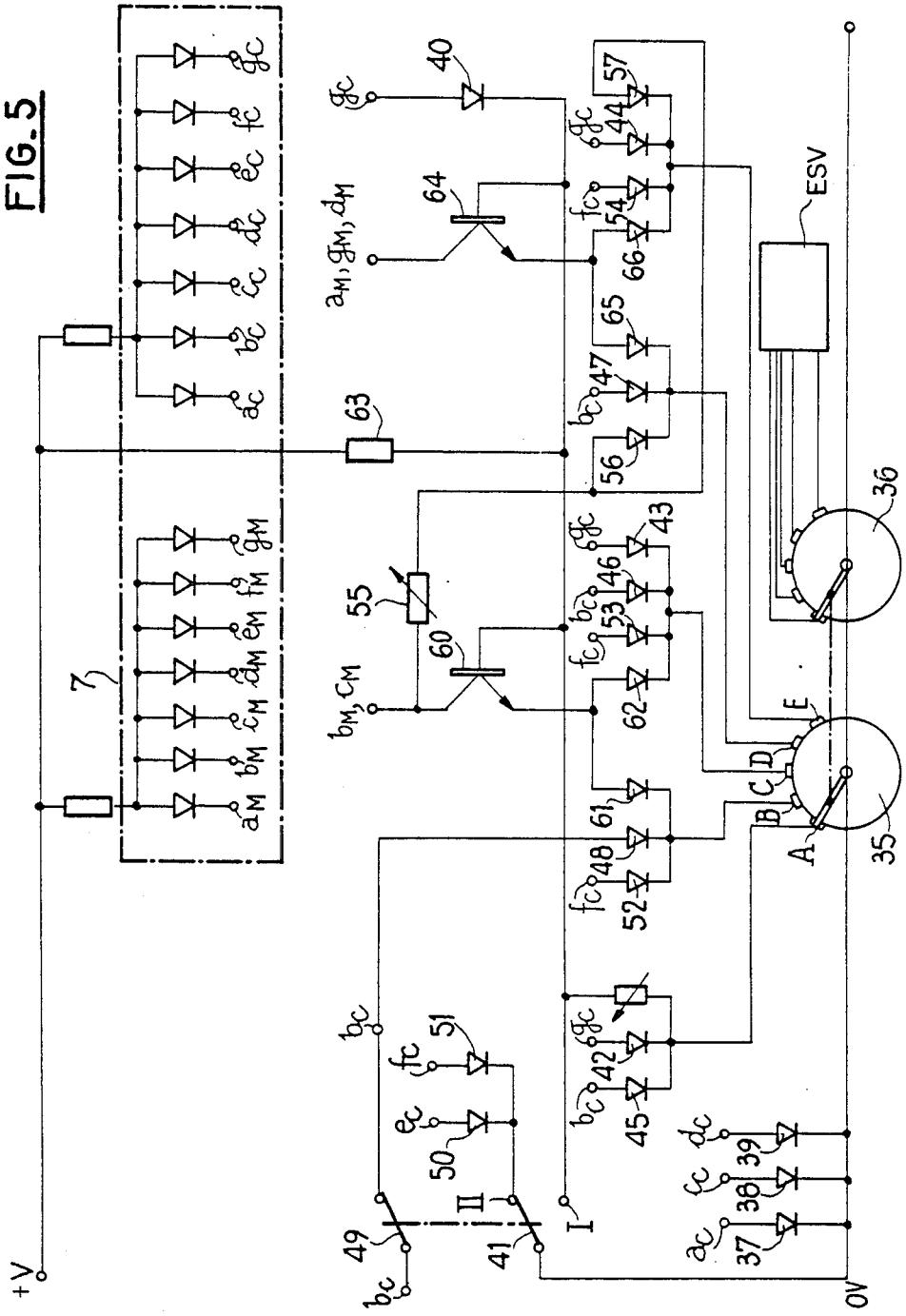
FIG. 5 is a complete diagram of the display circuit of the drilling machine simplified by the elimination of superfluous components and designed in accordance with the series of numbers corresponding to the table of the speeds given in FIG. 1.

The circuit shown in FIG. 5 is arranged by starting with the circuit shown in FIG. 2 for the purpose of maximum simplification and a reduction to a minimum of the number of components in its construction.

In the same way as the circuit shown in FIG. 2, it comprises a display device formed by two series of diodes $a_C$ to $g_C$ and $a_M$ to $g_M$. But instead of comprising two transistors by stage as the circuit shown in FIG. 2, it comprises only three transistors.

This result is obtained by eliminating all the components which will never be employed bearing in mind the nature of the numbers of the table 8.

The circuit shown in FIG. 5 therefore comprises a switch 35 which has five positions and is mechanically coupled to a switch 36 controlling the electronic speed variator ESV of the drilling machine and controlled by the knob 4 of the drilling machine (FIG. 1).

It comprises, as the circuit shown in FIG. 2, a display device 7 formed by two groups of seven electroluminescent luminescent diodes $a_C$ to $g_C$ representing the figures of the hundreds and $a_M$ to $g_M$ representing the figures of the thousands of the numbers to be displayed corresponding to the speeds selected by means of the selecting knob 4 (FIG. 1).

As in the case of FIG. 2, the display device is controlled by transistors and diodes.

However, the Applicant has found that the number of its components may be considerably reduced owing to the uselessness of certain of these components in a circuit similar to that shown in FIG. 2, bearing in mind the table of the speeds 8 to be displayed.

With reference to this table, it will indeed be found that the segments a, c, d, of the hundreds must always be supplied irrespective of the number of the table 8 selected.

Consequently, the electroluminescent diodes $a_C$, $c_C$ and $d_C$ are permanently connected to the supply terminals of the circuit shown in FIG. 3 in series with the diodes 37, 38, 39 respectively.

As can be seen in FIG. 5, the connections of the electroluminescent diodes with the components determining their conduction or their non-conduction are embodied relative to the reference of each electroluminescent diode on the corresponding terminal of the component to which it is connected.

The segment g of the hundreds must be illuminated for all the values of the group I of the low speeds.

Consequently, as the electroluminescent diode $g_C$ must be supplied permanently when the mechanical ratio changing knob 3 (FIG. 1) is in position I, this diode is connected to the terminals of the supply source of the circuit in series with a diode 40 through a switch 41 actuated by the knob 3 in the manner shown in FIGS. 6 to 8, reference to which will be made hereinafter.

In the presently-described embodiment, the switch 41 has two fixed contacts I and II which respectively correspond to the groups of speeds I and II of the table 8 shown in FIG. 1.

Further, the segment g of the hundreds must be illuminated for three of the values of the group II of the high speeds, namely 8, 18 and 36.

For this purpose, the electroluminescent diode $g_C$ of the hundreds is moreover respectively connected in series with three diodes 42, 43, 44 each connected to a fixed stud A, C, E, of the selecting switch 35 coupled to the control knob 4 (FIG. 1).

Owing to a reasoning similar to the preceding reasoning relating to the segments b, c and f of the hundreds effected from the table of the hundreds to be displayed, the electroluminescent diode $b_C$ is connected in series with a diode 45 to the stud A of the switch 35, in series with a diode 46 to the stud C of the switch 35 and in series with a diode 47 to the stud D of the switch 35.

Thus the segment b of the hundreds is illuminated when the switch 35 is placed on the studs A, C and D. The table 8 shows that in these positions, the segment b the hundreds must also be illuminated in order to participate in the display of the numbers 8, 18 and 30 of the line of the high speeds. The connections described hereinbefore for the low speeds also permit the illumination of the segment b for the high speeds when the switch 35 is in one of the positions A, B or D.

When the switch 35 is in the position B, the number 5 of the low speeds or the number 10 of the high speeds must be displayed.

It can be seen that for the display of the number 5, the segment b of the hundreds must be extinguished whereas for the display of the number 10, it must be illuminated.

For this purpose, the electroluminescent diode $d_C$ is connected to the stud B of the switch 35 through a diode 48 in series with a switch 49 mechanically coupled to the switch 41 and closed when the switch 41 is in the position II of the high speeds.

In the position E of the switch 35, neither of the numbers 15 and 36 to be displayed requires the illumination of the segment b so that there is no connection of the diode $b_C$ of the hundreds to the stud E.

The segment c of the hundreds must exist in none of the numbers of the group I of the low speeds and in all the numbers of the group II of the high speeds.

Consequently, the electroluminescent diode $e_C$ is connected to the terminals of the supply in series with a diode 50 and the fixed contact II of the switch 41.

The segment f of the hundreds must also appear in the numbers of the group II so that the electroluminescent diode $f_C$ is also connected through a diode 51 to the fixed contact II of the switch 41.

But the segment f of the hundreds must also participate in the display of the numbers 5, 9 and 15 of the group I of the low speeds.

The electroluminescent diode $f_C$ is therefore also connected to the stud B of the switch 35 through a diode 52 and to the studs C and E of the switch 35 through diodes 53 and 54 respectively.

The group of electroluminescent diodes $a_M$ to $g_M$ for displaying the thousands is connected according to the same principle as the group of the hundreds.

It will be noted that in respect of the low and high speeds, the segments b and c of the thousands must be illuminated for the positions D and E of the switch 35.

The electroluminescent diodes $b_M$ and $c_M$ are consequently connected through a variable resistor 55 and two diodes 56, 57 to the studs D and E of the switch 35.

The segments b and c of the thousands must moreover be illuminated in order to represent all the numbers of the group II of the high speeds except the number 8.

The electroluminescent diodes $b_M$, $c_M$ are therefore in addition connected to the studs B and C through the collector-emitter path of a transistor 60. The emitter of this transistor is connected to the studs B and C through diodes 61 and 62 respectively, whereas its base is connected to the fixed contact I of the switch 41. Thus the transistor 60 is rendered non-conductive when the switch 41 is in the position I corresponding to the low speeds.

The base of the transistor 60 is moreover connected to the positive terminal of the supply through a resistor 63, which results in its conduction when the switch 41 is placed in its position II of the high speeds.

To permit the display of the numbers 30 and 36 in the positions D and E of the switch 35, the segments a, d and g of the thousands must be illuminated when the switch 41 controlled by the ratio changing knob 3 is in the position II corresponding to the high speeds.

For this purpose, the electroluminescent diodes $a_M$, $d_M$ and $g_M$ are connected to the studs D and E of the switch 35 through the collector-emitter path of another transistor 64 in series with the respective diodes 65, 66. The base of the transistor 64 is connected to the fixed contact I of the switch 41 and to the resistor 63 which is moreover connected to the positive terminal +V of the supply source.

The simplifications in the circuit shown in FIG. 5, bearing in mind the table of the values of the speeds to be displayed, have for result that only the numbers of this table can appear in the window 6.

Moreover, the numbers of the line I of the low speeds can only appear if the switch 41 is in position I whereas the numbers of the line II of the high speeds can only appear if the switch is in the position II.

Thus the user can only operate his machine within the speed ranges chosen by the constructor in accordance with the drilling diameters and the materials to be drilled.

The table 8 (FIG. 1) in which these values are indicated assists the user in his choice.

The mechanical coupling between the mechanical ratio changing means actuated by the knob 3 of the drilling machine shown in FIG. 1 and the switch 41 of the circuit shown in FIG. 5 will now be described with reference to FIGS. 6 and 7.

FIGS. 6 and 7 show the part of the drilling machine of FIG. 1 comprising the spindle 70 of the latter which has splines 71 and on which is mounted a wheel 72 having two sets of teeth 73, 74 each of which corresponds to a mechanical ratio, said sets of teeth meshing with a gear pinion keyed on the output shaft of the electric driving motor EM.

The wheel 72 is movable in translation along the spindle 70 by a fork 75 actuated by the knob 3 (FIG. 1).

The inner end of the spindle 70 is mounted in a bearing 76 formed in a transverse wall 77 of the housing 1. Slidably mounted in the transverse wall 77 above the bearing 76 is a push-member 78 adapted to be actuated by the fork 75 and carrying, at the end thereof opposed to the fork, a diamond-shaped spring strip 79.

The branch of the spring 79 opposed to the push-member 78 is provided, roughly in facing relation to said push-member, with a finger member 80 which is movable in a direction parallel to the push-member.

The finger member 80 has a head 81 by which is secured the spring 79 at the same time as a second diamond-shaped spring strip 82 which is less stiff than the spring 79 and bears against a partition wall 83 of the housing 1.

The partition wall 83 has a passage 84 which permits the displacements of the finger member 80 beyond said partition wall and its coming into contact with the movable element 85 of the switch 41 of the circuit shown in FIG. 5.

The travel of the movable element 85 of the switch 41 is much smaller than that of the mechanical ratio changing fork 75 so that the assembly comprising the push-member 78, the springs 79, 82 and the finger member 80 constitutes travel-reducing means and avoids an untimely switching of the switch 41 under the effect of vibrations.

In the position shown in FIG. 6, this assembly occupies the position of the ratio I. Moreover, it can be seen that the fork 75 is located at a certain distance from the push-member 78 so that the latter is acted upon only at the end of the travel of the fork from ratio I to ratio II.

When the fork actuated by the knob 3 (FIG. 1) comes in contact with the push-member 78, the latter is urged toward the right as viewed in FIG. 6 and, owing to the fact that the spring 79 is stiffer than the spring 82, the latter is compressed and the finger member 80 is advanced until it comes in contact with the movable element 85 of the switch 41. Thereafter, as the resistance of the spring 82 increases under the effect of its compression, the spring 79, while being slightly crushed, transmits the force from the push-member 78 to the finger member 80 and to the movable element 85 of the switch 41 and causes it to switch to the ratio II.

At the end of the travel, the various elements of the assembly occupy the relative positions shown in dot-dash line in FIG. 7.

It can be seen that, in this position, the effects of the vibrations of the machine are absorbed by the springs 79 and 82 which are stressed.

In the position corresponding to the ratio I shown in full line in FIG. 7, the springs 79 and 82 have a sufficient residual stress for also avoiding an untimely switching of the switch 41.

It will be understood that, upon a change to the following ratio, the various component parts resume their respective positions shown in full line in FIGS. 6 and 7.

The modification shown in FIG. 8 differs from the device of FIGS. 6 and 7 in that the spring strips of the latter are replaced by coil springs 86, 87. The spring 86 is mounted between a projection 90 of the push-member 91 adapted to cooperate with the fork 75 and a projection 92 provided on an intermediate member 93 carrying the finger member 94 for actuating the switch 41. The spring 87 bears between the intermediate member 93 and the partition wall 83.

The operation of the device according to the invention will be understood from its construction described in detail hereinbefore.

However, it should be mentioned that the selection and the display of the speed by the user occur when the supply plug of the machine is connected to the mains supply before the driving motor of the machine is started up.

This implies that the display device, on one hand, and the speed variator and the electric motor, on the other hand, be supplied with current separately.

For this purpose, the knob controlling the display device simultaneously actuates the switch 23 of the display device of FIG. 2 and the switch 29 regulating the speed variator, or the corresponding elements 35 and 36 of the device shown in FIG. 5.

The motor is started up by means of the start-stop switch 5 (FIG. 1) which is connected on the downstream side of the switch 29 of FIG. 2 or of the switch 36 of FIG. 5.

Consequently, as soon as the plug of the drilling machine is connected to the mains supply, the display device 7 is able to indicate under what conditions the machine will operate when the trigger switch 5 is depressed.

The display device according to the invention therefore gives, as soon as the machine is connected to the main supply, the conditions of speed or rate of operation of the spindle which can be seen beforehand, the value indicated on the display device being a function of the position of the means controlling the mechanical ratio of the machine and of the speed variator of its electric driving motor.

Owing to the coupling of these control means to each other, there is no ambiguity between the displayed speeds and the respective values of the mechanical ratio and of the regulation of the speed variator.

In the embodiments just described, the machine to which the invention is applied comprises two mechanical ratios. However, it will be understood that the invention is also applicable to a machine having a number of mechanical ratios exceeding two.

Having now described my invention what I claim and desire to secure by Letters Patent is:

1. A machine, in particular an electric drilling machine, comprising a chuck, an electric driving motor having an output shaft, a speed reducer providing at least two mechanical ratios and coupled to the output shaft of the motor and to said chuck for driving the latter, changing means associated with the speed reducer for changing the mechanical ratio thereof, an electronic speed variator associated with the motor for varying the speed of the motor, control means operatively connected to said electronic speed variator for allowing selection of a plurality of predetermined discrete settings of said electronic speed variator, and display means connected to said changing means and said control means, said display means comprising means for displaying only those numbers corresponding to speeds within a range of discrete speed numbers, each of said discrete speed numbers being determined by a combination of particular settings of said mechanical ratio changing means and said control means, and being constant during operation of the machine.

2. A machine according to claim 1, wherein said display means comprises a display device, electronic means for controlling the display device in accordance with speed numbers to be displayed, first switching means coupled to the mechanical ratio changing means for placing said electronic control means in a state for displaying a group of speed numbers corresponding to the position of said first switching means, and second switching means coupled means in a state for displaying a given speed number among said group of speed numbers, said given speed number being determined by the position of said control means.

3. A machine according to claim 1, wherein said first switching means comprise a switch having a movable element which is mechanically connected to said mechanical ratio changing means through a unit for adapting the travel of the mechanical ratio changing means to the travel of the movable element of said switch.

4. A machine according to claim 3, wherein the mechanical ratio changing means comprise a splined spindle drivenly connected to said output shaft, a wheel axially slidably but drivenly mounted on the splined spindle, the wheel having two sets of teeth, a fork for axially displacing the wheel, an actuating knob mechanically connected to the fork, said adapting unit comprising a push-member adapted to be shifted by said fork and carrying, at an end thereof opposed to the fork, a first elastically yieldable means for actuating a finger member which is adapted to come into contact with the movable element of the switch.

5. A machine according to claim 3, comprising, placed between said first elastically yieldable means and a fixed partition wall of the machine, a second elastically yieldable means which is less stiff than the first elastically yieldable means and adapted to reduce the vibrations of said adapting unit to a minimum.

6. A machine according to claim 4 or 5, wherein said first elastically yieldable means comprise a first substantially diamond-shaped spring strip fixed to said push-member and carrying said finger member, and said second elastically yieldable means comprise a second substantially diamond-shaped spring strip less stiff than the first spring strip and fixed to the first spring strip with said finger member adapted to cooperate with the movable element of said switch.

7. A machine according to claim 4 or 5, wherein said first elastically yieldable means comprise a first coil spring mounted between said push-member and an intermediate member carrying said finger member, and said second elastically yieldable means comprise a second coil spring which is less stiff than the first spring and bears against said intermediate member and against a fixed partition wall of the machine.

8. A machine according to any one of the claims 2 to 5, wherein the display device comprises groups of electroluminescent diodes the illumination of which diodes is adapted to form segments of figures to be displayed, said electronic control means of the display device being arranged to ensure the display only of numbers contained in a predetermined table of speed values, said table having rows and columns, the rows corresponding to speed values as determined by the position of said changing means and the columns corresponding to speed values as determined by the position of said control means, each of said speed values corresponding to speeds at which the machine is adapted to operate and said electronic control means comprising for this purpose as many stages as said table comprises columns.

9. A machine according to any one of the claims 2 to 5, wherein said second switching means comprise a first switch having a plurality of positions each corresponding to a stage of said electronic control means, and a second switch coupled to said first switch and operatively connected to said speed variator of the motor for regulating the setting of said speed variator. Add the following claims.

10. A machine, in particular an electric drilling machine, comprising an electric driving motor having an output shaft, a speed reducer providing at least two mechanical ratios and coupled to the output shaft of the motor, changing means associated with the speed reducer for changing the mechanical ratio thereof, an electronic speed variator associated with the motor for varying the speed of the motor, control means operatively connected to said electronic speed variator for selecting a plurality of discrete settings of said variator, and display means operatively connected to said changing means and said control means for displaying a speed value as determined by the selected positions of said mechanical ratio changing means and said control means.

a switch means having a movable element which is mechanically connected to said mechanical ratio changing means through a unit for adapting the travel of the mechanical ratio changing means to the travel of the movable element of said switch means, the mechanical ratio changing means comprising a splined spindle drivenly connected to said output shaft, a wheel axially slidable but drivenly mounted on the splined spindle, the wheel having two sets of teeth, a fork for axially displacing the wheel, an actuating knob mechanically connected to the fork, said adapting unit comprising a push-member adapted to be shifted by said fork and carrying, at an end thereof opposed to the fork, a first elastically yieldable means for actuating a finger member which is adapted to come into contact with the movable element of said switch means.

11. A machine according to claim 10, comprising, placed between said first elastically yieldable means and a fixed partition wall of the machine, a second elastically yieldable means which is less stiff than the first elastically yieldable means and adapted to reduce the vibrations of said adapting unit to a minimum.

12. A machine according to claim 11, wherein said first elastically yieldable means comprise a first substantially diamond-shaped spring strip fixed to said push-member and carrying said finger member and said second elastically yieldable means comprise a second substantially diamond-shaped spring strip less stiff than the first spring strip and fixed to the first spring strip with said finger member adapted to cooperate with the movable element of said switch.

13. A machine according to claim 11, wherein said first elastically yieldable means comprise a first coil spring mounted between said push-member and an intermediate member carrying said finger member, and said second elastically yieldable means comprise a second coil spring which is less stiff than the first spring and bears against said intermediate member and against a fixed partition wall of the machine.

* * * * *